(12) United States Patent
King

(10) Patent No.: US 8,724,856 B1
(45) Date of Patent: May 13, 2014

(54) METHOD, SYSTEM AND COMPUTER PROGRAM FOR COMPARING IMAGES

(71) Applicant: Paycasso Verify Ltd., London (GB)

(72) Inventor: Russell King, London (GB)

(73) Assignee: Paycasso Verify Ltd, London (GB)

( * ) Notice: Subject to any disclaimer, the term of this patent is extended or adjusted under 35 U.S.C. 154(b) by 0 days.

(21) Appl. No.: 13/953,619

(22) Filed: Jul. 29, 2013

(30) Foreign Application Priority Data

Mar. 28, 2013 (GB) .................................. 1305814.4

(51) Int. Cl.
*G06K 9/00* (2006.01)
(52) U.S. Cl.
USPC ............................ 382/115; 713/186; 340/5.82
(58) Field of Classification Search
USPC ......... 382/115–127; 356/71; 713/186; 902/3; 340/5.8–5.86
See application file for complete search history.

(56) References Cited

U.S. PATENT DOCUMENTS

| 7,885,531 | B2 * | 2/2011 | Kim et al. ..................... | 396/153 |
| 2002/0158750 | A1 | 10/2002 | Almalik | |
| 2005/0212657 | A1 * | 9/2005 | Simon ......................... | 340/5.74 |
| 2006/0120575 | A1 | 6/2006 | Ahn | |
| 2006/0231610 | A1 | 10/2006 | Cheng | |
| 2008/0201579 | A1 * | 8/2008 | Whillock ....................... | 713/186 |
| 2008/0302870 | A1 | 12/2008 | Berini et al. | |
| 2009/0052751 | A1 * | 2/2009 | Chaney et al. ................ | 382/120 |
| 2009/0185241 | A1 | 7/2009 | Nepomniachtchi | |
| 2010/0008535 | A1 | 1/2010 | Abulafia et al. | |
| 2012/0114195 | A1 * | 5/2012 | Matsuda et al. .............. | 382/115 |
| 2012/0140993 | A1 | 6/2012 | Bruso et al. | |
| 2013/0336543 | A1 * | 12/2013 | Bennett et al. ................ | 382/112 |

FOREIGN PATENT DOCUMENTS

| CN | 101162500 A | 4/2008 |
| EP | 2140401 A2 | 1/2010 |
| WO | 2012079996 A1 | 6/2012 |

OTHER PUBLICATIONS

GB 1305814.4 Search and Exam Report Apr. 24, 2013.
GB 1305814.4 Search Report May 23, 2013.
GB 1305814.4 2nd Search Report May 23, 2013.

* cited by examiner

*Primary Examiner* — Aaron W Carter
(74) *Attorney, Agent, or Firm* — EIP US LLP

(57) ABSTRACT

A method of verifying whether a user of a device corresponds to a previously authenticated user is disclosed. In some embodiments, a processing system has access to a first image and a second image. The first image is of an identity document comprising an image of the previously authenticated user and data identifying the authenticated user. The identity document has been validated by a trusted authority. The second image is an image captured by the device. The first image is compared to said second image to determine whether they are images of the same user. One of the images is designated as a higher quality image, and stored as a validated image along with an identifier for the previously authenticated user. The validated image may be used in a subsequent verification event. The identifying data is be stored with the identifier, whereby to enable said data to be retrieved in a subsequent verification event.

23 Claims, 4 Drawing Sheets

METHOD, SYSTEM AND COMPUTER PROGRAM FOR COMPARING IMAGES

CROSS-REFERENCE TO RELATED APPLICATIONS

This application claims priority to the benefit under 35 U.S.C. §119(a) and 37 CFR §1.55 to GB Patent Application No. GB1305814.4, filed on Mar. 28, 2013, the entire contents of which are hereby incorporated by reference.

BACKGROUND OF THE INVENTION

1. Field of the Invention

The present application relates to a method, system and computer program for comparing images.

2. Description of the Related Technology

There is growing demand for services providers to provide their services via devices, such as PCs, tablets and mobile phones. However, for many service providers, the need to verify the credentials of the users to whom they are providing a service is very important. For providers of certain online services, for example, there is a need to ensure that their users are above a certain age. As an example, online banking service providers need to ensure that the identity of a user is reliably verified before that user is allowed access to user-restricted banking services. There are particular challenges when verifying the identity of a user via a device, compared to, for example, verifying a person's identity in via a face-to-face transaction.

SUMMARY

In accordance with embodiments of the present disclosure, there is provided a method, system and computer program for verifying users.

More specifically, according to a first embodiment, there is provided a method of verifying, by a processing system, whether a user of a device corresponds to a previously authenticated user, the processing system having access to a first image and a second image, the first image being an image of an identity document comprising an image of the previously authenticated user and data identifying the previously authenticated user, the identity document having been validated in respect of the previously authenticated user by a trusted authority, whereby to previously authenticate the user, and the processing system being arranged to derive, from the identity document, said data identifying the previously authenticated user, wherein the second image is an image captured by the device, the method comprising: comparing said first image to said second image, whereby to determine whether they are images of the same user; and, in the event that it is determined that the first and second images are images of the same user: designating one of the first and second images as the higher quality image; storing said designated image as a validated image of the previously authenticated user in a storage device together with an identifier for the previously authenticated user, said designated image being designated for use in a subsequent verification event for the previously authenticated user and; arranging for said derived data to be stored, together with said identifier for the previously authenticated user, whereby to enable said data to be retrieved in the subsequent verification event for the previously authenticated user.

According to a further embodiment, there is provided apparatus for use in verifying whether a user of a device corresponds to a previously authenticated user, the apparatus comprising: at least one processor; and, at least one memory including computer program code; the apparatus having access to a first image and a second image, the first image being an image of an identity document comprising an image of the previously authenticated user and data identifying the previously authenticated user, the identity document having been validated in respect of the previously authenticated user by a trusted authority, whereby to previously authenticate the user, and the apparatus being arranged to derive, from the identity document, said data identifying the previously authenticated user, wherein the second image is an image captured by the device, wherein the at least one memory and the computer program code is configured, with the at least one processor, to cause the apparatus at least to: compare said first image to said second image, whereby to determine whether they are images of the same user; and, in the event that it is determined that the first and second images are images of the same user: designate one of the first and second images as a higher quality image; store said designated image as a validated image of the previously authenticated user in a storage device together with an identifier for the previously authenticated user, said designated image being designated for use in a subsequent verification event for the previously authenticated user and; arrange for said derived data to be stored, together with said identifier for the previously authenticated user, whereby to enable said data to be retrieved in the subsequent verification event for the previously authenticated user.

According to another embodiment, there is provided a non-transitory computer-readable storage medium, comprising a set of computer-readable instructions stored thereon, which are for use in verifying whether a user of a device corresponds to a previously authenticated user, the computer-readable instructions being such that, when executed by a processing system having access to a first image and a second image, they cause the processing system to carry out a method according to the above embodiment, wherein: the first image is an image of an identity document comprising an image of the previously authenticated user and data identifying the previously authenticated user, the identity document having been validated in respect of the previously authenticated user by a trusted authority, whereby to previously authenticate the user, and the processing system is arranged to derive, from the identity document, said data identifying the previously authenticated user, and the second image is an image captured by the device.

According to a yet further embodiment, there is provided a method of comparing two images by a processing system in order to determine whether they represent the same entity, the method comprising: assessing an image quality of each of a plurality of sections of a first of said two images, whereby to assign an image quality to each of said plurality of sections of the first image; for at least one section of the first image that is determined to have an image quality different from the image quality of others of said plurality of sections of the first image; performing an image processing process, the image processing process comprising: configuring a matching algorithm for that section of the first image in dependence on the assigned image quality of the section; and using the configured matching algorithm to compare said section of the first image with a corresponding section of the second of said two images whereby to generate an output; using said output to determine whether the first and second images represent the same entity.

According to another embodiment there is provided a processing system for use in comparing two images in order to determine whether they represent the same entity, the processing system being configured to: assess an image quality of each of a plurality of sections of a first of said two images, whereby to assign an image quality to each of said plurality of sections of the first image; for at least one section of the first image that is determined to have an image quality different from the image quality of others of said plurality of sections of the first image; perform an image processing process, the image processing process comprising: configuring a matching algorithm for that section of the first image in dependence on the assigned image quality of the section; and using the configured matching algorithm to compare said section of the first image with a corresponding section of the second of said two images whereby to generate an output; and, use said output to determine whether the first and second images represent the same entity.

The processing system in any of the above embodiments may comprise at least one processor and at least one memory including computer program instructions, the at least one memory and the computer program instructions being configured, with the at least one processor, to perform the methods described above. The processing system may be embodied on a user terminal device such as a mobile device, or on a server system, in which case the images can be received by the server system from a device remote therefrom. Further, the arrangements described herein may be embodied on a non-transitory computer-readable storage medium storing said computer program instructions.

DETAILED DESCRIPTION OF CERTAIN INVENTIVE EMBODIMENTS

A conventional way of verifying the identity and/or credentials of a person is to ask that person to provide documentation that supports their identity and/or credentials. For example, a person may be asked to provide a valid photographic ID, such as a passport or driving license as proof of their identity. In this case, in order to verify that person's identity, typically two separate checks are performed. Firstly, the validity of the photographic ID is checked and secondly the person providing the photographic ID is compared to the image on the photographic ID in order to verify that the photographic ID belongs to that person. Typically, these checks are performed by a human.

There are known techniques for checking the validity of an identity document, such as a photographic ID, via a device. For example, by configuring a device to look for certain features in an image, it is possible to verify, up to a reasonable level of certainty, via a device, whether an image of an identity document is an image of a valid identity document. Such features may include, for example, the inclusion of certain check digits within machine readable zones on the identity document (which can be read by a device using optical character recognition (OCR) techniques), or the inclusion of an image of a human face that is located in an expected position relative to other features of the document. Other validity indicators include, for example, the inclusion of water marks or holograms, and the use of particular fonts.

Figure 1:
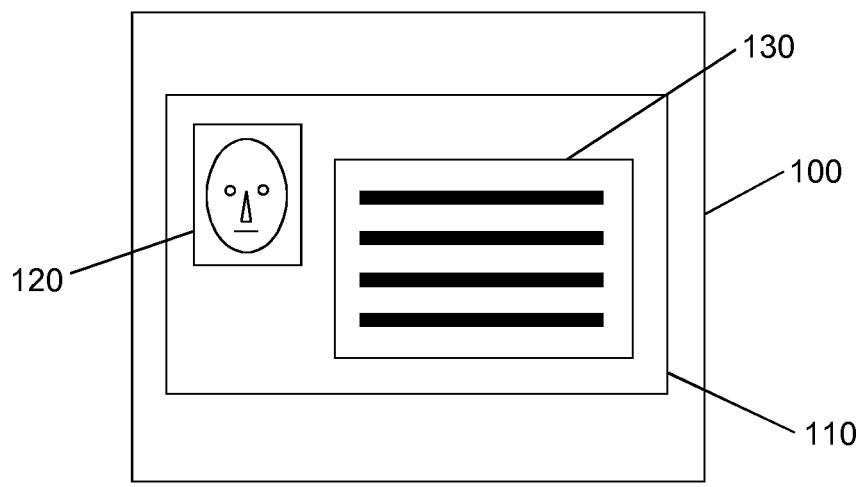
FIG. 1 illustrates schematically an exemplary first captured image according to an arrangement of the present disclosure.
Figure 2:
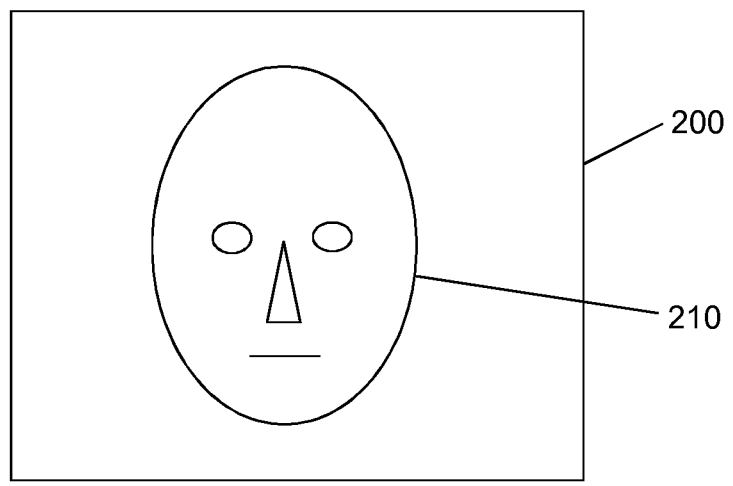
FIG. 2 illustrates schematically an exemplary second captured image according to an arrangement of the present disclosure.

It has been recognized by the present inventors that, if it were possible to perform the second check via a device, namely the comparison of the face of a user of a device to the picture of a human face on a photographic ID held by the user of the device, then it would be possible to authenticate the user of the device in this way. It has been realized by the present inventors that this could be achieved by configuring a device to capture an image of the user of the device, and an image of an identity document held by the user of the device, and to compare the image of the user of the device to the picture of the human face on the identity document to determine whether they represent the same entity. FIGS. 1 and 2 show examples of two such captured images 100, 200.

The first image 100, as illustrated schematically in FIG. 1, is an image of an identity document 110, which is associated with a person. The identity document 110 contains a picture 120 of the person associated with the identity document 110. Typically, an identity document 110 will include details 130 which can be used to identify the identity and/or other credentials of the person associated with the identity document 110. Identity documents are typically issued by a trusted authority, such as the Government, for example. Such a trusted authority will have previously verified that the picture 120 is a picture of the person associated with the identity document 110 and will have authenticated that person as the person associated with the details 130. The identity document may be a physical document, such as an identity card, passport or certificate, or it may be an electronic document, such as a digital photograph and associated identity data.

The second image 200, as illustrated schematically in FIG. 2, is an image of the user 210 of a device, which has been captured e.g. by a camera on the device. By comparing the first and second images 100, 200, it is possible to verify whether the user 210 of the device, at the time that the second image 200 was captured, is the person associated with the identity document 110.

Many facial recognition and matching technologies exist in the art. In order to reliably perform the required matching, most such technologies require facial images to be of a high quality such that they contain sufficient distinctive detail to determine whether they represent the same person. Factors that typically affect the reliability of facial matching between two images include the resolution of the images (which can be usefully quantified as the number of pixels between the eyes of the person) and the illumination of the person's face. Images with too much illumination appear washed out, such that only very strong facial features, such as the eyes and nose stand out, and images with too little illumination have only very limited contrast and thus the mentioned strong facial features are less visible.

Pictures 120 on identity documents 110 are typically of a low quality. For example, they are typically small, over-exposed and have a low resolution. Furthermore, many identity documents 110 have visible security features printed over the picture 120, which can obscure facial details in the picture 120, making facial matching difficult. If the identity document 110 is subsequently imaged, the quality of the face in question is yet reduced.

Current facial matching technologies do not perform well enough to reliably perform a comparison between the very low-quality captured picture 120 in an image 100 of an identity document 110 and an image 200 of a user 210 of a device, which has been captured by the device. Embodiments are, therefore, concerned with providing an image matching method that can reliably compare a low-quality image with another image so as to determine whether they represent the same entity.

Figure 3:
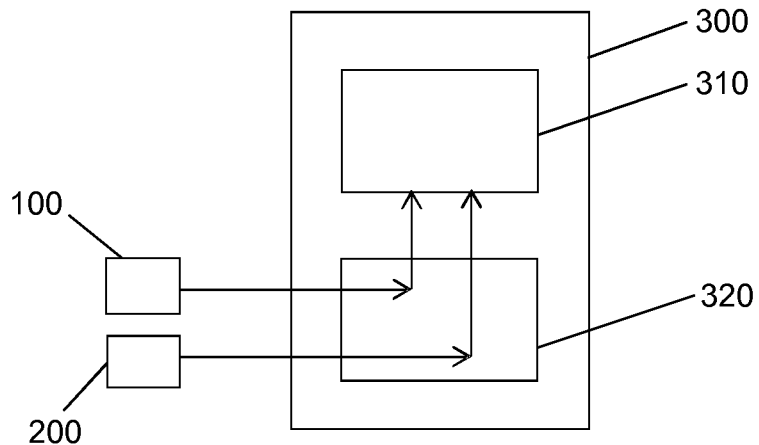
FIG. 3 illustrates schematically an exemplary device configured to carry out a method according to an arrangement of the present disclosure.

FIG. 3 shows a block diagram of a device 300 arranged to carry out a comparison according to an exemplary arrangement. The device 300 may be, for example, a mobile phone, a computer or a tablet. The device 300, in this example, comprises a processing system 310 and an image capture component 320, such as a camera. The image capture component 310 may be integral with the device 300, or it may be separate from, but communicable with the device 300.

In the present arrangement, the device 300 is configured to capture both a first image 100 of an identity document 110 associated with a previously authenticated user, and a second image 200 of a user 210 of the device 300. These images 100, 200 are provided to the processing system 310 as illustrated schematically by the arrows in FIG. 3. In an alternative arrangement, the processing system 310 may be remote from the device 300, in which case, the device 300 may send the first and second images 100, 200 to the processing system 310 via a wired or wireless network for example. This arrangement is discussed in more detail below, with reference to FIG. 7.

In yet another arrangement, the first image 100 may have previously been captured and stored in a storage device, and the processing system 310 may be arranged to retrieve the first image 100 from the storage device.

Figure 4:
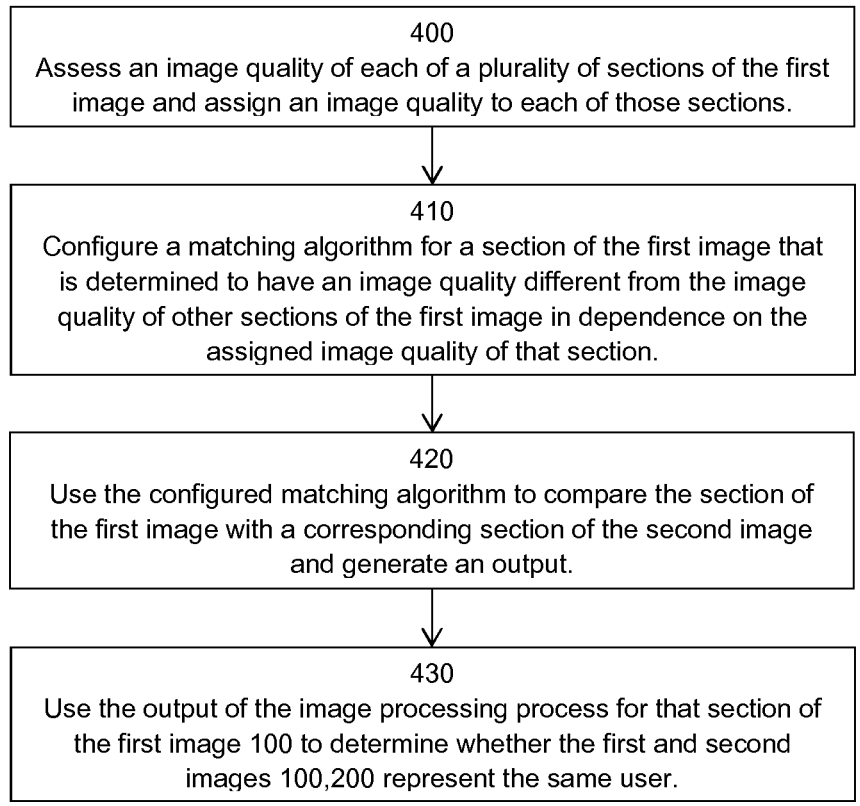
FIG. 4 shows a flow chart of a method according to an arrangement.

The processing system 310 is arranged to compare the first image 100 to the second image 200 to determine whether they represent the same user (i.e. to determine whether the user 210 represented in the second image 200 is the previously authenticated user associated with the identity document 110). FIG. 4 shows a flow chart illustrating the steps involved in the comparison process according to an arrangement.

Figure 5:
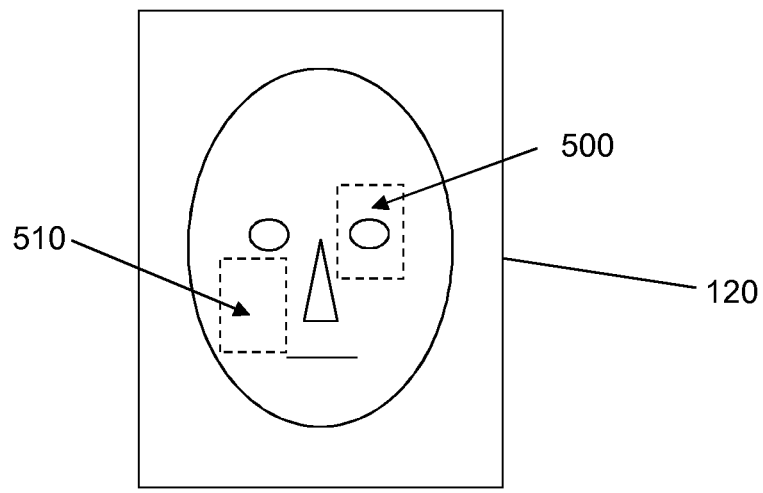
FIG. 5 illustrates schematically a close up of an exemplary first captured image according to an arrangement of the present disclosure.

At step 400, the processing system 310 is configured to assess an image quality of each of a plurality of sections of the first image 100, whereby to assign an image quality to each of the plurality of assessed sections of the first image 100. FIG. 5 shows a close-up of the first image 100, showing the captured picture 120 of a previously authenticated user associated with the identity document 110. Two exemplary sections 500, 510 of the image are indicated by dashed lines, the first 500 covering the eye area, and the second 510 covering the cheek area. In this example, each of these sections 500, 510 is assigned an image quality. The assigned image quality may correspond to the suitability of that section for facial matching, which can be affected by a number of factors as discussed above.

Typically, images are made up of an array of pixels having different intensities. In one arrangement, the quality of a section, such as the first section 500, may be assessed using wavelet processing to identify the variation in pixel intensity between pixels within a given area within that section.

More specifically, considering the first section 500 as an example, a grid of wavelets can be convolved with the pixels that make up the first section 500 whereby to provide responses indicative of the change in pixel intensity over the area covered by the wavelet. By using wavelets of differing sizes, features of the image can be identified and the "sharpness" of those features can be determined.

For example, a large change in pixel intensity over a relatively small area would indicate a relatively sharp feature, whereas a smaller change over a larger area would indicate a relatively unclear feature. Sections of the image that contain sharp features typically contain detail that can be used for facial matching. For example, images of eyes, which typically contain a great deal of detail in a relatively small area, usually contain relatively large variations in pixel intensity over a small region. Images of cheeks, on the other hand, which typically contain little in the way of detail that is useful for facial matching, usually contain very little variation in pixel intensity over the whole area. Thus sections of the image 100 having sharper features (i.e. a greater variation in pixel intensity per unit area) may be assigned a higher quality than sections with fewer sharp features. In this case, the first section 500 would most likely be assigned a higher image quality than the second section 510.

Further, the sharpness of the features identified in a given section, and/or other characteristics of the identified features, may be compared to the characteristics of features within a set of training images. The set of training images may comprise one or more sets of images with "desired" features and one or more sets of images with "undesirable" features. These sets of images can be used to further assess the quality of a section of an image 100. For example, where a section of the image 100 having sharp features has been identified, the test images may be used to determine whether those sharp features are likely to be facial features or whether they are likely to be non-facial features, such as security marks printed over the face, for example. A set of images with desired features may be made up of a set of images of human faces that are suitable for facial comparison. Sets of images having undesirable features may include, for example, sets of images of human faces with features such as security marks imposed thereon. Sets of training images may also be used to train the processing system 310 to distinguish between the face of a person with light skin, which was captured in low lighting conditions, and the face of a person with darker skin.

Through use of such training images, the processing system 310 can, therefore be trained to distinguish between the characteristics of desirable facial features and the characteristics of un-desirable features. In other words, training images can be used to identify the sections of an image that are likely to be of most use when performing an image comparison. In this arrangement, sections 500, 510 that have been determined to include desirable features may be assigned a high image quality relative to sections with fewer desirable features, and/or sections with more undesirable features.

As another example, the quality of a section may alternatively or additionally be assessed by determining the number of pixels per unit area in a given section. It will be appreciated that there are other indicators of image quality, and these may be used as an alternative or in addition to the above to assign image qualities to sections of the first image 100.

After the processing system 310 has assigned image qualities to a plurality of sections of the first image 100, the processing system 310 then performs an image processing process for at least one section of the first image 100 that is determined to have an image quality different from the image quality of the other assessed sections of the first image 100. The processing process comprises steps 410 and 420. Considering the first section 500 as an example, at step 410, the processing system 310 configures a matching algorithm for the first section 500 in dependence on the assigned image quality of that section 500.

At step 420, the processing system 310 uses the configured matching algorithm to compare the first section 500 with a corresponding section of the second image 200 (i.e. a section of the second image 200 that covers the same part of the face as is covered by the first section 500 of the first image 100).

The section of the second image 200 that corresponds to the first section 500 of the first image 100 may be determined using conventional facial recognition techniques such as those described above to identify the major features of a human face, such as the eyes, nose, and mouth, in each of the first and second images 100, 200. These features may be used as anchor points to fit a grid of sections to each of the images 100, 200 such that each section in the grid covers a predetermined portion of the face.

The output from the matching algorithm for the first section 500 of the first image 100 may be indicative of the probability that the first section 500 represents a part of a face that is also present in the corresponding section of the second image 200. The matching algorithm may be configured to compare the first section 500 to the corresponding section of the second image 200 by comparing the features (or characteristics of the features) within the first section 500 with the features (or characteristics of the features) within the corresponding section of the second image 200 to determine whether there is a match.

More specifically, in one arrangement, the processing system 310 may compare the first section 500 of the first image 100 to the corresponding section of the second image 200 by first analyzing the variation in pixel intensity as discussed above. The variation in the pixel intensity across the first section 500 may be represented numerically. This process may be repeated for the corresponding section of the second image 200 thereby generating a numeric representation of the change in pixel intensity across this section of the second image 200. The two numeric representations may then be compared to determine whether the two sections have the same feature characteristics.

To speed up the comparison process, and reduce the computational demand on the processing system 310, the size of the numerical representations of the sections may, in one arrangement, be reduced using discriminant analysis.

The image processing process may be repeated for multiple sections of the first image 100, in which case the matching algorithm is configured according to the assigned image qualities of multiple sections of the first image 100 and is used to compare those sections of the first image 100 to the corresponding sections of the second image 200 thereby generating multiple outputs.

Finally, at step 430, the processing system 310 is configured to use the one or more outputs from the matching algorithm to determine whether the first image 100 includes an image of the user 210.

Assessing the image quality of sections of the first image 100 and configuring the matching algorithm in dependence upon the assigned image quality of at least one of those sections means that the image qualities of the different sections can be taken into account when assessing the significance of a close match (or lack thereof) between a given one of those sections and the corresponding section of the second image 200.

In an example where the first section 500 of the first image 100 is assigned a higher image quality than the second section 510, greater significance may, for example, be attached to a close match (or lack thereof) between the first section 500 and the corresponding section than would be attached to a close match (or lack thereof) between the second section 510 and the corresponding section of the second image 200.

This is particularly useful where the first image 100 is of generally low quality (as is typically the case with captured images of pictures 120 on identity documents 110, as discussed above). This is because, if the first image 100 were to be compared to the second image 200 as a whole, strong correspondence (or lack thereof) between parts of the first image 100 that have little detail (such as the cheeks for example), may bias the overall comparison result, leading to an incorrect determination as to whether the images 100, 200 represent the same user 210. In other words, by considering the quality of the first image 100 section-by-section, a matching algorithm can be configured that takes into account the biasing effect of sections of an image that have a low image quality.

In one particular arrangement, the matching algorithm may be configured to take these biasing effects into account by weighting the outputs for the sections of the first image 100 and then combining the weighted outputs to generate a value indicative of the probability that the first and second images 100, 200 represent the same user 210. The weightings for outputs for sections of the first image 100 with a higher image quality can be set higher than the weightings for outputs for sections with a lower image quality. The combined weighted outputs may then be compared to a threshold value to determine whether the images represent the same user.

In one arrangement, the matching algorithm may be configured for sections of the first image that have been determined to have an image quality above a predetermined threshold. In this case, those sections with assigned image qualities above that threshold are compared to the corresponding sections of the second image 200, and the sections with assigned image qualities below the threshold are not compared to the second image 200. This reduces the computational demand on the processing system 310 and prevents strong similarities or differences between those low-quality sections and the corresponding sections of the second image 200 from biasing the overall comparison result.

If it is determined that the first and second images 100, 200 are images of the same user 210, the user 210 of the device 300 can be authenticated as the user associated with the identity document 110. Before the user 210 is authenticated as the user associated with the identity document 110, the processing system 310 may carry out further steps to verify that the image 100 is an image of a valid identity document; however, these steps are beyond the scope of the present application.

Although the above method for comparing two images to determine whether they represent the same user 210 has been described in the context of comparing a picture 120 in a first image 100 of an identity document 110 to a second image 200 of a user 210 of a device 300, it will be appreciated that the method is applicable for comparing any two images to determine whether they represent the same entity. As discussed above, the method is particularly useful where the first image 100 is a low-quality image, such as any image that was previously captured on a reprographic medium other than one directly associated with the processing system 310, as the biasing effects of the low-quality sections of the image on the overall comparison result can be reduced.

In general, therefore, the method may comprise a preliminary step of assessing the overall image qualities of the two images to be compared and designating the image with the lower overall image quality as the first image 100 and the image with the higher overall image quality as the second image 200 before carrying out the image matching process as described above.

When it is known that the one of the two images to be compared is an image 100 of an identity document 110, it may be assumed that the image of the identity document 110 is the lower-quality image (as discussed above, the pictures 120 on identity documents 110 are, in general, of very poor quality for the purpose of facial matching).

More generally, however, where the above method is used to compare any two facial images, the image qualities may be assessed with respect to the suitability of the images for facial comparison. Factors that affect the suitability of an image of a person for facial comparison include: whether that person was stationary when the image was captured, whether the person was looking at the camera (or other image capture device) when the image was captured, whether the person had their eyes open, and whether the person is wearing items that obscure their face, such as glasses. As mentioned above, other factors include the resolution of the image and the illumination of the person's face.

In one arrangement, the above-mentioned set of training images may be used to assess the quality of the images 100, 200. The use of training images to train the processing system 310 to recognize certain "desirable" features and to distinguish them from other similar "undesirable" features, as discussed above. For this purpose, training images may be used to train the processing system 310 to recognize images where lighting is sub-optimal, for example. Thus, the processing system 310 may determine which of two images to be compared is the lower quality image by determining which of those images has the most "desirable" features.

As an alternative or additional preliminary step, the processing system 310 may compare the image quality of the two images to a threshold quality and may, for example, request an alternative image if the image quality of one of the images is below the threshold quality. It is particularly useful to compare the quality of the second image 200 to a threshold quality, because a better second image of the user 210 may be captured by, for example, instructing the user 210 of the device 300 to find better lighting conditions.

In addition or as an alternative, in the event that the first image 100 is determined not to be an image of the user 210 represented in the second image 200, the device 300 may be configured to capture a further image of the user 210 and to compare this image to the first image 100 as described above. Again, the user 210 may be given directions as to how to improve the quality of the second image 200. Thus, if the first image 100 was actually an image of the user 210, but was determined not to be an image of the user 210 due to the poor image quality of the second image 200, then the likelihood of the comparison result being correct for the further image of the user 210 can be increased by capturing a further second image, of suitably improved image quality.

Figure 6:
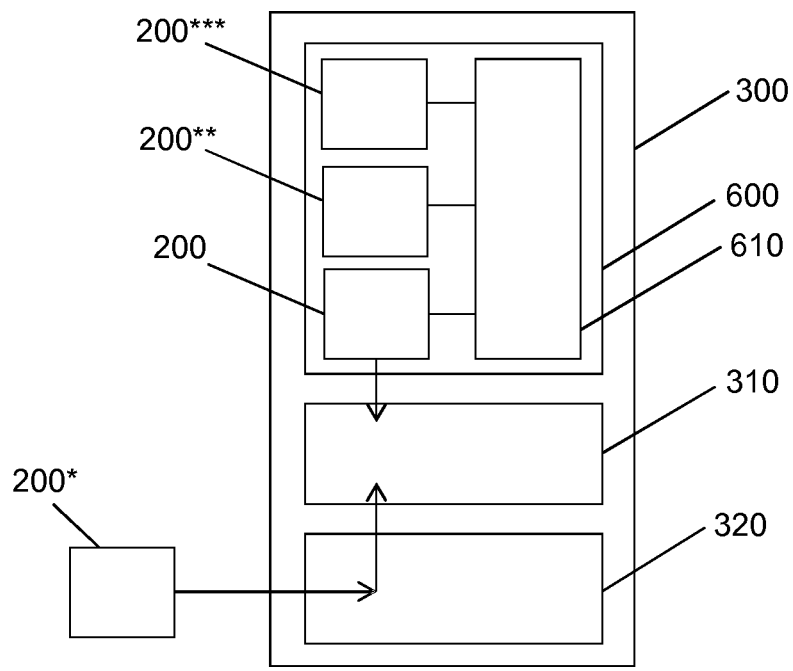
FIG. 6 illustrates schematically an exemplary device configured to carry out a method according to an arrangement of the present disclosure; and, FIG. 7 an exemplary processing system, and exemplary devices configured to carry out a method according to an arrangement of the present disclosure.

According to another embodiment, in one arrangement, the processing system 310 has access to a storage device 600, as shown in FIG. 6. Once it has been determined that the first image 100 of the identity document 110 and the second image 200 of the user 210 of the device 300 represent the same user, the second image 200 of the user 210 may be stored as a validated image of the user associated with the identity document 110 in the storage device 600 as shown in FIG. 6.

As discussed above, typically, the second image 200 captured by the device 300 will be of a higher quality than the first image 100 of the identity document 110. In one arrangement, if a user of the device 300 later wishes to authenticate himself on the device 300 as the previously authenticated user 210 associated with the identity document 110, the processing system 310 may capture a subsequent image 200* of the user of the device 300 and may compare the subsequent image 200* with the validated second image 200 to determine whether they are images of the same user. The images may be compared according to the method described above, or alternatively, a conventional facial matching algorithm may be used to compare the images.

In the event that it is determined that the two images 200, 200* represent the same user, the processing system 310 can authenticate the user of the device 300 as the previously authenticated user 210 associated with the identity document 110.

In the present arrangement, therefore, once the user 210 has been authenticated once using an image 100 of an identity document 110, the user 210 need not provide any further images of identity documents 100 in order to authenticate himself in subsequent authentication events. Instead, the user 210 can authenticate himself using the stored validated image 200.

Furthermore, by storing the second image 200, in preference to, for example, the first image 100, the reliability of subsequent authentication events can be improved. This is because the second image 200 will typically be of higher quality than the first image 100 and thus subsequent authentication events are carried out by comparing two relatively high-quality images 200, 200* to one another, rather than comparing a very low quality image (the first image 100) to a higher quality image 200*. In effect, therefore, it could be said that the second image 200 is designated as the higher quality image when it is stored. The validated second image 200 may be used for all subsequent authentication events for the user 210.

Alternatively, in one arrangement, if it is determined that a subsequently captured image 200* of a user of the device 300 represents the previously authenticated user 210 represented in the validated second image 200, the processing system 310 may also store the subsequently captured image 200* as a validated image of the previously authenticated user 210 in the storage device 600. Two exemplary subsequently captured images 200, 200*, which have been previously validated using the second image 200 as being images of the user associated with the identity document 110, are shown schematically as being stored in the storage device 600 in FIG. 6.

The processing system 310 may, in one arrangement, compare the qualities of the validated second image 200 and the subsequently captured image 200* and may designate one as the higher quality image. Thereafter, in a further subsequent authentication event, the processing system 310 may select the designated higher-quality image from the storage device 600 and use that image in the further subsequent authentication event, thereby further improving the reliability of the comparison result in the further subsequent authentication event. In one arrangement, the processing system 310 may assign an image quality to each stored validated image, and each time the processing system 300 validates a user of the device 300, it may select the highest quality validated image from the storage device 600 to authenticate the user.

The stored validated images 200, 200, 200* may be encoded with a one-way encoding algorithm before they are stored. In other words, the images 200, 200, 200* may be stored as numerical representations, from which the original images cannot be derived. When a subsequently captured image 200* of a user of the device 300 is compared to a stored encoded image 200, 200, 200* in the storage device 600, the subsequently captured image 200* is therefore similarly encoded before it is compared to the stored encoded image. As discussed above, the computational demand on the processing system 310 is lower when a comparison is performed between numerical representations of images (e.g. encoded images), rather than between the original images themselves, and thus by encoding images before they are compared, the comparison can be carried out faster.

The processing system 310 may, in one arrangement, generate or otherwise derive a unique user identifier 610 for the user 210 associated with the identity document 110, and may store this identifier 610 together with the second image 200 and any other stored validated images 200\*, **200\*\*\* of the user 210. The processing system 310 may use this identifier 610 to retrieve a validated image of the user 210 from the storage device 600 in subsequent authentication events for the user 210**.

In one particular example, the unique user identifier 610 for the user 210 may be a hash value derived from details relating to the user 210. The details may, for example comprise the first and last name of the user 210, and the date of birth of the user 210. These details may have been derived by the processing system 310 from the identity document 110 (using optical recognition, for example, or other suitable techniques).

Thereafter, in order to identify the user 210 to the processing system 310 in a subsequent authentication event for the user 210, the processing system 310 need only be provided with details relating to the user 210 that is being authenticated, from which it can then derive the unique user identifier 610. The processing system 310 may alternatively or additionally store certain user details in association with, but separately from, the unique user identifier.

The processing system 310 may also, in one example, send the unique user identifier 610 for the user 210 to a server remote from the processing system 310 whereby to indicate to the server that the user 210 of the device 300 has been authenticated as a user associated with the unique user identifier 610. This is useful, for example, where the user of the device 300 is requesting access to a service provided by the remote server via the device 300, and the remote server needs to verify the identity of the user 210 of the device 300 before it provides the service.

In one arrangement, the processing system 310 may store details relating to the identity of the user 210 associated with the identity document 110 together with the validated image 200 of the user 210. These details may, in one example, have been derived from the image 100 of the identity document 110. For example, where the identity document contains details 130, these details may be extracted using optical character recognition and stored.

Alternatively, the stored details may have been provided by the user 210 of the device 300 when the user 210 was initially authenticated with the first image 100 of the identity document 110.

In any event, in a subsequent authentication event, when a user of the device 300 is authenticated as the previously authenticated user 210 associated with the identity document 110, these details can be retrieved from the storage device 600. The details may, in one example, be sent to a server remote from the processing system 310 whereby to identify the authenticated user to the server.

As mentioned above with reference to FIG. 3, the processing system 310 may be remote from the device 300. In this arrangement, the processing system 310 may authenticate users on a plurality of devices. When a captured image 200\* of a user of a given device is determined to represent a previously authenticated user 210 (either by comparison of the captured image 200\* with an image 100 of an identity document 110 or by comparison of the captured image 200\* with a stored image 200, **200\*\*, 200\*\*\*, which has been previously validated by the processing system 310 as being an image of the previously authenticated user 210), the processing system 310 may store a unique device identifier for that device, together with the captured image 200\***. This unique device identifier could be used in several ways as will become apparent in the following description.

The unique device identifier may be used to identify suspicious user behavior. As an example, if a user of a device tries to authenticate himself as a given previously authenticated user, but the given previously authenticated user has only ever authenticated himself on a different device, then the processing system 310 may be able to determine, from the unique device identifiers for the devices, that the authentication is a suspicious authentication.

Further, when a user of a device wishes to authenticate himself to a server remote from the processing system 310 via the device, the unique user identifier can be sent to a server whereby to identify to the server on which device the user has been authenticated.

According to a further embodiment, before an image 200 of the user 210 of the device 300 that has been captured by the device 300 is compared to an image of a previously authenticated user (i.e. either an image of an identity document 110 associated with the user, or an image that has been previously validated by the processing system 310 as an image of the user), a check may be made to verify that the second image 200 is an image of a live user.

Such a check may comprise the steps of capturing a series of images of the user of the device 300, and comparing successive images to look for differences between successive images that indicate that the images are images of a live user. Once two successive images have been taken that are sufficiently different to indicate that the images are images of a live user, the processing system 310 may use one of those images as the second image 200 in a comparison process as described above.

Carrying out such a check would prevent a user of a device 300 from authenticating himself as a different user by holding a photograph of the different user in front of the image capture component 320.

In one arrangement, before performing a comparison between two successively captured images to look for differences between those images, the images may be analyzed to determine portions of the image that represent a human face, and portions of the image that represent background (sets of training images may be used for such an analysis, as described above). In this arrangement, at least one section of one of the images that is determined to include both facial features and background features may be compared to a corresponding section of the other image to look for movement of the face with respect to the background. Such a comparison may be done on a pixel-by-pixel basis.

Alternatively or additionally, at least one section of one of the images that is determined to include facial features only is compared to a corresponding section of the other image. Such a comparison may look for differences between the images indicative of facial movement, such as blinking.

Pairs of subsequently captured images may be compared either until a pair of subsequently captured images is identified which are sufficiently different as to indicate the images are images of a live user, or until a predetermined number of pairs of subsequently captured images have been compared. Alternatively, pairs of subsequently captured images may be compared until a predetermined time has elapsed.

Figure 7:
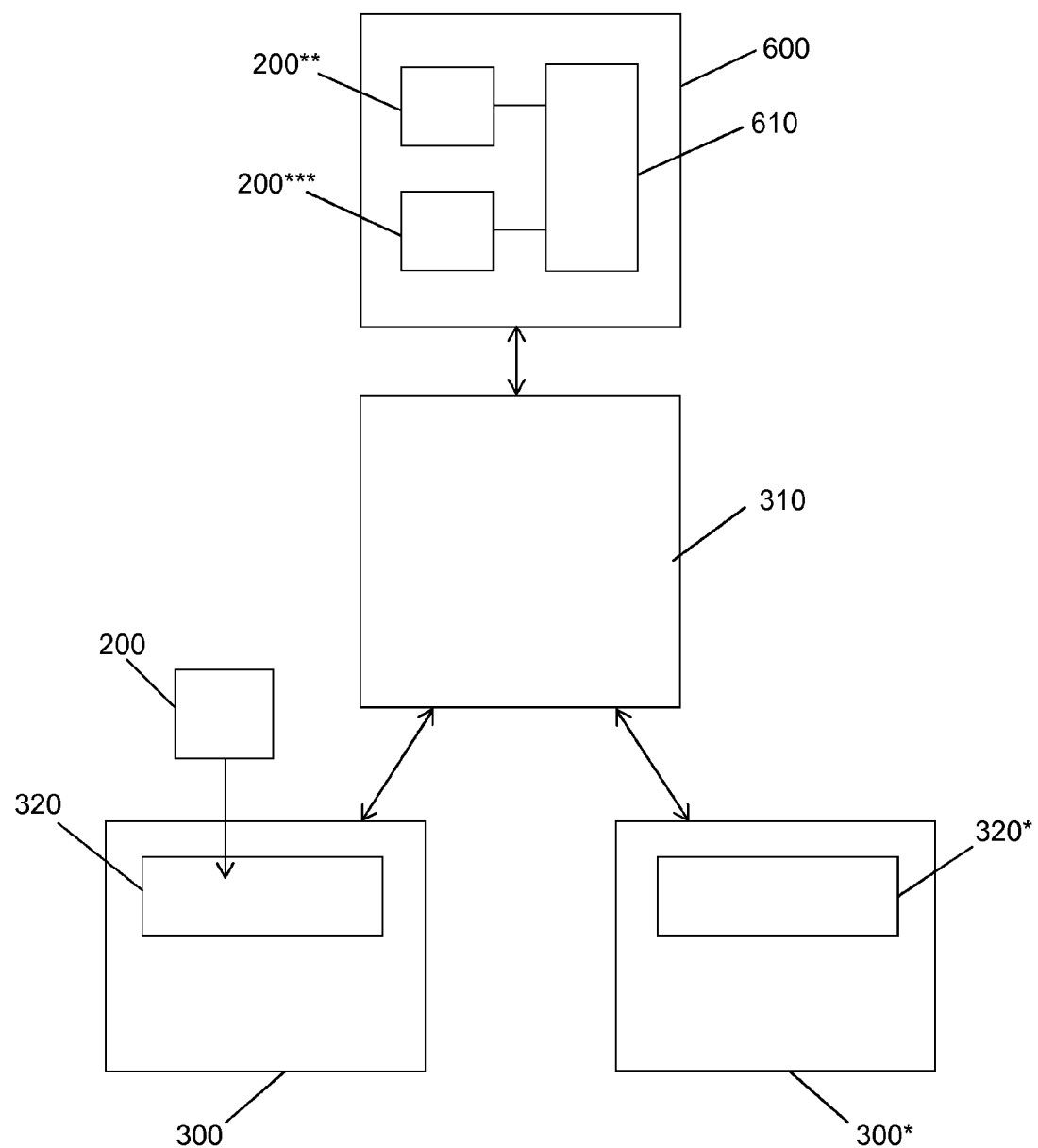

As mentioned above, with reference to FIG. 3 in particular, in one arrangement, the processing system 310 is remote from the device 300. FIG. 7 shows schematically an exemplary remote processing system 310 in such an arrangement. The processing system 310 is communicatively connected to a plurality of devices, there being two (300 and 300*) such devices shown in FIG. 7.

In one example, a user of a first of the two devices 300 initiates a user authentication event on the first device 300 whereby to cause the first device 300 to capture an image of the user of the first device 300. The first device 300 may also capture an image 100 of an identity document 110 associated with a user 210, as discussed above. In this arrangement, the first device 300 then sends the two captured images 100, 200 to the processing system 310, and upon receipt, the processing system 310 determines whether the two images 100, 200 are images of the same user. The processing system 310 may carry out the steps as shown in FIG. 4 to determine whether the images represent the same user.

The authentication event may be associated with an authentication event identifier. The identifier may be generated by the processing system 310 or the first device 300, but in any event, the authentication event identifier is shared between the two components 300, 310 whereby to identify the authentication event to the two components 300, 310.

Once the processing system 310 has determined whether the images represent the same user, the processing system 310 may send an indication to the first device 300, so as to confirm the result of the authentication event, together with the authentication event identifier, whereby to indicate to the first device 300 whether the user of the first device 300 is the user 210 represented in the identity document 110 for that authentication event.

Alternatively, where the processing system 310 has previously authenticated the user 210, the processing system 310 may already have one or more validated images 200, 200*** of the user 210 stored in a storage device 600. In this case, therefore, the first device 300 may not send an image 100 of an identity document 110 associated with the user 210 to the processing system 310, but may instead send details identifying the user to the processing system 210 which can be used by the processing system 310 to identify the user 210 and retrieve a validated image of the user 210 from the storage device 600**.

As discussed above, in one arrangement, the processing system 310 may store validated images 200, 200*** of the user 210 together with a user identifier 610 for the user 210. In this arrangement, the details sent from the first device 300 to the processing system 310 may comprise the user identifier 610 for the user 210, or alternatively, the details may comprise details from which the user identifier 610 can be derived. This latter case is applicable, for example, where the user identifier 610 is a hash value as discussed above with reference to FIG. 6**.

Once an validated image 200, 200*** of the user 210 has been retrieved from the storage device 600, the processing system 310 compares the image 200 of the user of the first device 300, which was received from the first device 300, to a previously validated image 200**, 200*** of the user 210 whereby to verify whether the user of the device 300 is the previously authenticated user 210**.

Again, the authentication event may be associated with an authentication event identifier, and the processing system 310 may indicate the authentication result, together with the authentication event identifier, to the first device 300.

As will be appreciated, users typically have more than one device, each of which has the means for capturing images. Accordingly, the image 100 of the identity document 110, may be captured by the second device 300*, while the first device 300 is used to take an image of the "live" user. This may be useful if, for example, the second device 300* can capture images that are of a higher quality than the images captured by the first device 300. In this arrangement the authentication event identifier described above may be provided to both devices 300, 300* so that the processing system 310 can identify that images received from the two different devices relate to the same authentication event.

Upon receiving the two images 100, 200, the processing system may be configured to verify that the two images 100, 200, are associated with the same authentication event identifier before comparing them whereby to determine whether they represent the same user, in the manner described above.

As previously mentioned, a given validated image 200 of a previously authenticated user 210 may be stored in conjunction with details relating to the device that is used to capture the image on which the previously authenticated user 210 validates himself. Thus, where a previously authenticated user 210 has a plurality of devices 300, 300*, and authenticates himself via the plurality of devices 300,300*, a plurality of validated images 200, 200*** of the user 210 may be stored in a remote storage device 600**.

In one arrangement, in a subsequent authentication event for the previously authenticated user 210, the processing system 310 may select a previously validated image 200, 200*** of the previously authenticated user 210 from the storage device 600 at least in dependence on the unique device identifier of the device on which the previously authenticated user 210 wishes to authenticate himself (i.e. the "authenticating" device). As an example, the processing system 310 may select a previously validated image 200**, 200*** of the user 210 that was captured by the authenticating device to validate the user of the authenticating device. This may improve the reliability of the facial matching results, because the two images to be compared are likely to be similar, as they were captured by the same device. The processing system 310 may also determine which of the stored previously validated images 200**, 200*** to use when validating the user in dependence upon the designated image qualities of the images, as discussed above. For example, the processing system 310 may use a previously validated image 200**, 200***** that was captured by a device different from the authenticating device if it is of significantly higher quality than a validated image that was captured by the authenticating device.

The above embodiments are to be understood as illustrative examples of the inventions taught herein. Further embodiments are envisaged. For example, in relation to the embodiment where validated images are stored in a storage device 600, the processing system 310 may be configured to assess the image qualities of each validated image and may store an association between those images and their determined image qualities. In a subsequent authentication event, the processing system 310 may select the highest quality image from the storage device 600 and compare this to an image of the user of a device whereby to authenticate that user. Alternatively, the processing system 310 may only store a captured image if it is of higher quality than the validated image of a previously authenticated user with which it was compared. If the captured image is of higher quality, the processing system 310 may replace the previously validated image with the captured image, such that only one validated image of a given user is stored at any one time.

The above passages have described examples relating to the various aspects of the present disclosure, whereby to enable the skilled person to readily appreciate the scope of the various inventions taught herein. An overview of these aspects will now be presented.

In a first embodiment, the disclosure provides a method of comparing two images by a processing system in order to determine whether they represent the same entity, the method comprising: assessing an image quality of each of a plurality of sections of a first of said two images, whereby to assign an image quality to each of said plurality of sections of the first image; for at least one section of the first image that is determined to have an image quality different from the image quality of others of said plurality of sections of the first image; performing an image processing process, the image processing process comprising: configuring a matching algorithm for that section of the first image in dependence on the assigned image quality of the section; and using the configured matching algorithm to compare said section of the first image with a corresponding section of the second of said two images whereby to generate an output; using said output to determine whether the first and second images represent the same entity.

The quality of a section of the first image can be usefully assessed by determining the amount of detail the section contains that is useful for performing an image matching process with another image. Sections of the first image that contain little in the way of detail that is useful for facial matching can bias the overall comparison result between the first image and the second image. By considering the image quality of the first image section-by-section, the sections of the first image that contain little such detail can be identified, and can be taken into account when configuring the matching algorithm, such that the biasing effect of those sections can be reduced. Thus, arrangements according to the first embodiment provide a method for improving the reliability of a determination as to whether the first and second images represent the same entity.

In one arrangement, the image quality of a said section is determined by identifying features within that section and comparing characteristics of said features to characteristics of features of a predetermined set of training features. The set of training images may comprise one or more sets of images with "desired" features and one or more sets of images with "undesirable" features. A set of images with desired features may be made up of images that are suitable for image comparison. Sets of images having undesirable features may include, for example, sets of images with poor lighting, or blurred features.

Alternatively, or additionally, the image quality of a said section may be determined by identifying features within that section and determining the sharpness of the identified features. A section having features with a relatively high determined sharpness may be assigned a higher image quality than a section having features with a relatively low determined sharpness. The sharpness of a feature can be assessed by, for example, determining the change in pixel intensity over a given area. A large change in pixel intensity over a relatively small area could indicate a relatively sharp feature, whereas a smaller change over a larger area could indicate a relatively unclear feature. Sections of an image that contain sharp features typically contain detail that can be useful for image matching.

In one arrangement, the matching algorithm for a given section of the first image is configured to: convert said section of the first image and the corresponding section of the second image into first and second numerical representations of said sections of the first and second images respectively, the first and second numerical representations being representations of characteristics of said features within the sections of the first and second images respectively; and, compare said first and second numerical representations whereby to determine whether the first and second images represent the same entity.

The characteristics of the features represented by the numerical representations may include, for example, the change in pixel intensity over a given area. Converting the sections into numerical representations in this way reduces the computational demand on the processing system when performing the comparison between the two sections, compared to performing the comparison on, say, a pixel-by-pixel basis.

The method may, in one example, comprise: performing the image processing process for a plurality of said sections of the first image, whereby to generate a plurality of outputs, each corresponding to a comparison for a said section of the first image; and using the respective outputs for said sections of the first image to determine whether the first and second images represent the same entity. In this example, the matching algorithm is configured to take account for the image qualities of a plurality of sections, thereby further improving the reliability of the determination as to whether the first and second images represent the same entity.

In one arrangement, the configured matching algorithm is configured to combine said respective outputs, said combining comprising: assigning a relatively high weighting to an output corresponding to a comparison for a said section of the first image having a relatively high assigned image quality; assigning a relatively low weighting to an output corresponding to a comparison for a said section of the first image having a relatively low assigned image quality; and combining said weighted outputs. Thus, a close match (or lack thereof) between sections of the first image with high image quality and sections of the second image will contribute more towards the overall match result (i.e. the combined weighted outputs) than a close match (or lack thereof) between sections of the first image with a lower image quality and sections of the second image. Thus the biasing effect of the sections with lower image quality is reduced.

The above-mentioned weighted outputs may be combined to give a value indicative of the probability that the first and second images represent the same entity, and said step of determining whether the first and second images represent the same entity may comprise comparing said value to a predetermined threshold value.

Responsive to a determination that the first and second images represent the same entity, the method may further comprise storing the second image, or a representation of said second image, in a storage device, with an identifier associated with said entity. This is particularly useful in the case where the first image is a previously validated image of an entity, and the first image is of lower overall quality than the second image. This is because the above-described method can be used to determine whether the second image is a representation of the entity, and then the second image can be used subsequently, instead of the first image, to determine whether further images are images of that entity. In determining whether the further images are images of the entity, comparison would be made between those images and the second image, rather than the first image. The result of such a comparison is likely to be more reliable because the second image is a higher quality than the first image.

The above-mentioned identifier may, in one arrangement, be derived from the first image or the second image. The identifier may be derived from features within the first or second image. For example, if one of the images were to include some text, the identifier may be derived by using optical character recognition to extract the text from the image and using that text (or an encoded version of that text) as an identifier. Alternatively, it may be that one of the images was stored in a storage device together with some details relating to the image. In this case, the identifier may be derived from those details.

In one arrangement, the first image is an image that has been previously captured on a reprographic medium other than one directly associated with the processing system. Such an image is likely to be of low quality. An example of such an image may be an image of an identity document.

Optionally, the first image may be an image that has been captured by or in conjunction with the processing system. Alternatively or additionally, the second image may be an image that has been captured by or in conjunction with the processing system. Where the processing system is a component of a device, the first and/or second image may be captured by an image capture component of the device, for example. Alternatively, where the processing system is, for example, a remote server, the first and/or second image may have been captured by a device remote from the processing system, which is working in conjunction with the processing system to determine whether the first and second images represent the same entity.

In the event that it is determined that the first and second images do not represent the same entity, the method may comprise successively capturing further images by or in conjunction with the processing system, and comparing each said further image with the first image whereby to determine whether they represent the same entity. This arrangement is particularly advantageous where the second image is an image captured by a mobile device, because the image capture conditions of a mobile device can be variable (the lighting, for example, depends greatly on the location and orientation of the device). Thus, if it were incorrectly determined that the first and second images do not represent the same entity due to the poor image quality of the second image, a further image can be captured and compared to the first image. The likelihood of the comparison result being correct for the further image of the user can be increased if the further image is of suitably improved image quality.

In one arrangement, the method further comprises comparing the overall image qualities of the two images and designating the image with the lower overall image quality as the first image and the image with the higher overall image quality as the second image. The lower-quality image is likely to have a greater number of sections that contain little in the way of detail that is useful for image comparison, and thus the effectiveness of the above method in improving the reliability of the image matching result can be increased be designating the lower-quality image as the first image.

In a second embodiment, the disclosure provides a method of verifying, by a processing system, whether a user of a device corresponds to a previously authenticated user, the processing system having access to a first image and a second image, the first image being an image of an identity document comprising an image of the previously authenticated user and data identifying the previously authenticated user, the identity document having been validated in respect of the previously authenticated user by a trusted authority, whereby to previously authenticate the user, and the processing system being arranged to derive, from the identity document, said data identifying the previously authenticated user, wherein the second image is an image captured by the device, the method comprising: comparing said first image to said second image, whereby to determine whether they are images of the same user; and, in the event that it is determined that the first and second images are images of the same user: designating one of the first and second images as the higher quality image; storing said designated image as a validated image of the previously authenticated user in a storage device together with an identifier for the previously authenticated user, said designated image being designated for use in a subsequent verification event for the previously authenticated user and; arranging for said derived data to be stored, together with said identifier for the previously authenticated user, whereby to enable said data to be retrieved in the subsequent verification event for the previously authenticated user.

By comparing the image of the previously authenticated user in the identity document to the second image, it is possible to determine whether the user of the device corresponds to the previously authenticated user. Moreover, by deriving data identifying the previously authenticated user from the identity document, the user of the device can be identified by the processing system. Currently identity documents are typically issued in the form of a card or other reprographic medium; however the present arrangement is equally applicable where the identity document is an electronic identity document, for example. An example of such an electronic identity document could be a digital passport, which has a digital representation of an image of the previously authenticated user stored on a chip, together with data identifying the previously authenticated user.

By storing one of the first or second images in a storage device as a validated image of the previously authenticated user, together with an identifier for the previously authenticated user, the stored image can be used in a subsequent verification event for the previously authenticated user. The stored image may, for example be compared to a newly captured image of a user of the device in a subsequent verification event, in order to determine whether the user of the device corresponds to the previously authenticated user. By arranging for the data derived from the identity document to be stored, together with the identifier for the previously authenticated user, the data can be retrieved in a subsequent verification event and used to identify the user of the device in that verification event. Thus, the present embodiment provides a method for enabling the user of a device to be verified in a subsequent authentication event, without the user having to provide an image of an identity document.

The data derived from the identity document may, in one arrangement, be stored in a storage system of the processing system. Alternatively or additionally, the data may be sent to a system remote from the processing system, for storage by the remote system such as a third party, e.g. when the user initially registers for service with the third party and the third party requires the user to be authenticated using methods according to the embodiments described herein.

The reliability of an image matching result (and therefore the reliability with which the user of a device can be verified) is reduced when the images to be compared are of a lower quality. This is a particular problem in the present embodiment, because images on identity documents are typically of a low quality (i.e. small and over-exposed, with a low resolution). Furthermore, many identity documents have visible security features printed over the image, which can obscure facial details in the picture. By designating one of the first and second images as the higher quality image, and then storing the designated image as a validated image of the previously authenticated user together with an identifier for the previously authenticated user, however, it is possible to improve the reliability with which a user is verified in a subsequent verification event. This is because the higher-quality, designated image can be used as an alternative to the lower-quality image to verify whether a user of a device corresponds to the previously authenticated user in a subsequent verification event.

Advantageously, in a subsequent verification event for a user of the device, the method comprises comparing an image that has subsequently been captured by said device as part of the subsequent verification event to said designated image whereby to determine whether the user of the device is said previously authenticated user. Using the higher-quality designated image for the comparison improves the reliability of the result of the subsequent verification event.

In the event that it is determined, in the subsequent verification event, that the user of the device is the previously authenticated user, the method may comprise: using said identifier for the previously authenticated user to retrieve the details derived from the first image; and, sending said details to a system remote from the processing system together with said identifier. The system remote from the processing system may be, for example, a system of a service provider who wishes to verify the identity of the user of the device.

In one arrangement, the method comprises encoding said second image using a one-way encoding algorithm prior to storing the encoded second image at said step of storing the second image.

As mentioned above, he previously authenticated user may be associated with an identifier. The identifier may be used to retrieve the designated image from the storage device if the previously authenticated user subsequently wishes to authenticate himself in a subsequent verification event.

Furthermore, the identifier may be used in other ways. For example, in the event that it is determined that the first and second images are images of the same user, the method may further comprise sending said identifier to a system remote from said processing system whereby to indicate that the user of the device has been verified as the user associated with said identifier. The system remote from the processing system may be, for example, a system associated with a service provider with which the user of the device wishes to authenticate himself and/or which wishes to verify the identity of the user of the device.

In one arrangement, the device is associated with a unique device identifier, and in the event that it is determined that the first and second images are images of the same user, the method further comprises storing an association between said unique device identifier and the second image.

In the event that it is determined that the first and second images are images of the same user, the method may further comprise sending said unique device identifier to a system remote from said processing system together with an indication that the user of the device has been verified. This may be particularly useful where the system remote from the processing system is associated with a service provider as discussed above, and the service provider provides services directly to devices.

In one arrangement, said step of designating one of the first and second images as the higher quality image comprises the step of comparing the image quality of the first image to the image quality of the second image. Alternatively, it may be assumed that the second image is the higher quality image without performing a comparison. However, performing such a comparison of the image qualities of the first and second images ensures that the higher quality image can always be used in a subsequent verification event.

Advantageously, said step of comparing the first image to the second image, whereby to determine whether they are images of the same user comprises: assessing an image quality of each of a plurality of sections of the first image, whereby to assign an image quality to each of said plurality of sections of the first image; for at least one section of the first image that is determined to have an image quality different from the image quality of others of said plurality of sections of the first image: configuring a matching algorithm for that section of the first image in dependence on the assigned image quality of that section of the first image; and using the configured matching algorithm to compare said section of the first image with a corresponding section of the second image, whereby to determine whether the first and second images are images of the same user.

In a third embodiment, the disclosure provides a method of verifying whether the user of a device is a user that has been previously authenticated in respect of the user, in which the device has access to a plurality of images, at least two of which have been captured for the user within a continuous time period, the method comprising: performing a difference detecting process for said at least two images, said difference detecting process comprising: comparing said at least two images whereby to detect differences therebetween; and, determining whether said detected differences are sufficient to indicate that said at least two images correspond to a live user, whereby to output a liveness indicator; and in dependence in the liveness indicator, selectively comparing one of said at least two images to a previously validated image of said previously authenticated user in an image matching process in order to determine whether said compared image corresponds to the previously authenticated user.

Performing such a difference detecting process before comparing a captured image for a user to a previously validated image of the previously authenticated user ensures that the captured image for the user is an image of a live user (i.e. the user in possession of the device) and is not, for example, an image of a photograph of a user not in possession of the device. If the difference between the two images is not found to be sufficient, then the image matching process may not be performed and the user may not be verified as the previously authenticated user.

In the event that said detected differences are determined not to be sufficient to indicate that said at least two images correspond to a live user, the method comprises repeating said difference detecting process for a different two images which have been captured for the user within said continuous time period whereby to output a liveness indicator for said two different images, and selectively performing an image matching process for one of said different two images in dependence upon the liveness indicator. This is useful in the case that the user of the device is remaining particularly still as it allows more time for movement of the user to be detected.

Furthermore, the method may further comprise repeating said difference detecting process for a plurality of different images that have been captured within said continuous time window. Thus, in effect, the user of the device is given a predetermined time in which they can "prove" that they are a live user (i.e. they are given a predetermined time to display movements indicative of "liveness"). If the difference detecting process does not find sufficient difference between the images captured in that time window, it may be determined that the images are not images of a live user, and thus the image matching process may not be carried out for the user.

In one arrangement, said step of detecting differences between said at least two images comprises comparing the pixels within a section of a first of said at least two images to the pixels within a corresponding section of the second of said two images, said sections being sections that have been determined to include facial features. Changes in the expression of the user can be detected in this way and such changes can be used to identify an image of a live user.

Alternatively or additionally, said step of detecting differences between said at least two images may comprise comparing the pixels within a section of a first of said at least two images to the pixels within a corresponding section of the second of said at least two images, said sections being sections that have been determined to include both facial features and background features. Changes of the position of the user with respect to the background can be detected in this way and such changes can be used to identify an image of a live user.

In a fourth embodiment the disclosure provides a processing system for use in comparing two images in order to determine whether they represent the same entity, the processing system being configured to: assess an image quality of each of a plurality of sections of a first of said two images, whereby to assign an image quality to each of said plurality of sections of the first image; for at least one section of the first image that is determined to have an image quality different from the image quality of others of said plurality of sections of the first image; perform an image processing process, the image processing process comprising: configuring a matching algorithm for that section of the first image in dependence on the assigned image quality of the section; and using the configured matching algorithm to compare said section of the first image with a corresponding section of the second of said two images whereby to generate an output; and, use said output to determine whether the first and second images represent the same entity.

In a fifth embodiment, the disclosure provides apparatus for use in verifying whether a user of a device corresponds to a previously authenticated user, the apparatus comprising: at least one processor; and, at least one memory including computer program code; the apparatus having access to a first image and a second image, the first image being an image that of an identity document comprising an image of the previously authenticated user and data identifying the previously authenticated user, the identity document having been validated in respect of the previously authenticated user by a trusted authority, whereby to previously authenticate the user, and the apparatus being arranged to derive, from the identity document, said data identifying the previously authenticated user, wherein the second image is an image captured by the device, wherein the at least one memory and the computer program code is configured, with the at least one processor, to cause the apparatus at least to: compare said first image to said second image, whereby to determine whether they are images of the same user; and, in the event that it is determined that the first and second images are images of the same user: designate one of the first and second images as a higher quality image; store said designated image as a validated image of the previously authenticated user in a storage device together with an identifier for the previously authenticated user, said designated image being designated for use in a subsequent verification event for the previously authenticated user and; arrange for said derived data to be stored, together with said identifier for the previously authenticated user, whereby to enable said data to be retrieved in the subsequent verification event for the previously authenticated user.

In a sixth embodiment, the disclosure provides a processing system for verifying whether the user of a device is a user that has been previously authenticated in respect of the device, the processing system having access to a plurality of images, at least two of which have been captured by the device for the user within a continuous time period, the processing system being configured to: perform a difference detecting process for said at least two images, said difference detecting process comprising: comparing said at least two images whereby to detect differences therebetween; and determining whether said detected differences are sufficient to indicate that said at least two images correspond to a live user, whereby to output a liveness indicator; and in dependence in the liveness indicator, selectively compare one of said at least two images to a previously validated image of said previously authenticated user in an image matching process in order to determine whether said compared image corresponds to the previously authenticated user.

The processing system in any of the above embodiments may comprise at least one processor and at least one memory including computer program instructions, the at least one memory and the computer program instructions being configured, with the at least one processor, to perform the methods of the first, second and third embodiments described above. The processing system may be embodied on a user terminal device such as a mobile device, or on a server system, in which case the images can be received by the server system from a device remote therefrom. Further, the arrangements described herein may be embodied on a non-transitory computer-readable storage medium storing said computer program instructions.

It is to be understood that any feature described in relation to any one arrangement may be used alone, or in combination with other features described, and may also be used in combination with one or more features of any other of the arrangements, or any combination of any other of the arrangements. Furthermore, equivalents and modifications not described above may also be employed without departing from the scope of the application, which is defined in the accompanying claims.

Although at least some embodiments of the arrangements described herein with reference to the drawings comprise computer processes performed in processing systems or processors, the application also extends to computer programs, particularly computer programs on or in a carrier, adapted for putting embodiments into practice. The program may be in the form of non-transitory source code, object code, a code intermediate source and object code such as in partially compiled form, or in any other non-transitory form suitable for use in the implementation of processes according to embodiments described above. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

It will be understood that the processing system referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

What is claimed is:

1. A method of verifying, by a processing system, whether a user of a device corresponds to a previously authenticated user, the processing system having access to a first image and a second image, the first image being an image of an identity document comprising an image of the previously authenticated user and data identifying the previously authenticated user, the identity document having been validated in respect of the previously authenticated user by a trusted authority, whereby to previously authenticate the user, and the processing system being arranged to derive, from the identity document, said data identifying the previously authenticated user, wherein the second image is an image captured by the device, the method comprising:

comparing said first image to said second image, whereby to determine whether they are images of the same user; and, when it is determined that the first and second images are images of the same user:

designating one of the first and second images as a higher quality image;

storing said designated image as a validated image of the previously authenticated user in a storage device together with an identifier for the previously authenticated user, said designated image being designated for use in a subsequent verification event for the previously authenticated user; and arranging for said derived data to be stored, together with said identifier for the previously authenticated user, whereby to enable said data to be retrieved in a subsequent verification event for the previously authenticated user.

2. The method of claim 1, in which in a subsequent verification event for a user of the device, the method comprises comparing an image that has subsequently been captured by said device as part of the subsequent verification event to said designated image whereby to determine whether the user of the device is said previously authenticated user.

3. The method of claim 2, in which in the event that it is determined, in the subsequent verification event, that the user of the device is the previously authenticated user, the method comprises:

using said identifier for the previously authenticated user to retrieve the details derived from the first image; and, sending said details to a system remote from the processing system together with said identifier.

4. The method of claim 1, comprising encoding said second image using a one-way encoding algorithm prior to storing the encoded second image at said step of storing the second image.

5. The method of claim 1, in which, in the event that it is determined that the first and second images are images of the same user, the method further comprises sending said identifier to a system remote from said processing system whereby to indicate that the user of the device has been verified as the user associated with said identifier.

6. The method of claim 1, wherein the device is associated with a unique device identifier, and in the event that it is determined that the first and second images are images of the same user, the method further comprises storing an association between said unique device identifier and the second image.

7. The method of claim 6, in which, in the event that it is determined that the first and second images are images of the same user, the method further comprises sending said unique device identifier to a system remote from said processing system together with an indication that the user of the device has been verified.

8. The method of claim 1, in which said step of designating one of the first and second images as the higher quality image comprises the step of comparing the image quality of the first image to the image quality of the second image.

9. The method of claim 1, wherein the processing system is communicatively connected to a plurality of devices whereby to verify whether a user on any of said plurality of devices corresponds to a said previously authenticated user.

10. The method of claim 1, in which said step of comparing the first image to the second image, whereby to determine whether they are images of the same user, comprises:

assessing an image quality of each of a plurality of sections of the first image, whereby to assign an image quality to each of said plurality of sections of the first image;

for at least one section of the first image that is determined to have an image quality different from the image quality of others of said plurality of sections of the first image:

configuring a matching algorithm for that section of the first image in dependence on the assigned image quality of that section of the first image; and using the configured matching algorithm to compare said section of the first image with a corresponding section of the second image, whereby to determine whether the first and second images are images of the same user.

11. An apparatus for use in verifying whether a user of a device corresponds to a previously authenticated user, the apparatus comprising:

at least one processor; and, at least one memory including computer program code;

the apparatus having access to a first image and a second image, the first image being an image of an identity document comprising an image of the previously authenticated user and data identifying the previously authenticated user, the identity document having been validated in respect of the previously authenticated user by a trusted authority, whereby to previously authenticate the user, and the apparatus being arranged to derive, from the identity document, said data identifying the previously authenticated user, wherein the second image is an image captured by the device, wherein the at least one memory and the computer program code are configured, with the at least one processor, to cause the apparatus at least to:

compare said first image to said second image, whereby to determine whether they are images of the same user; and, when it is determined that the first and second images are images of the same user:

designate one of the first and second images as a higher quality image;

store said designated image as a validated image of the previously authenticated user in a storage device together with an identifier for the previously authenticated user, said designated image being designated for use in a subsequent verification event for the previously authenticated user; and arrange for said derived data to be stored, together with said identifier for the previously authenticated user, whereby to enable said data to be retrieved in the subsequent verification event for the previously authenticated user.

12. The apparatus of claim 11, wherein the at least one memory and the computer program code are further configured, with the at least one processor, to cause the apparatus at least to, in a subsequent verification event for a user of the device, compare an image that has subsequently been captured by said device as part of the subsequent verification event to said designated image whereby to determine whether the user of the device is said previously authenticated user.

13. The apparatus of claim 12, wherein in the event that it is determined, in the subsequent verification event, that the user of the device is the previously authenticated user, the at least one memory and the computer program code are further configured, with the at least one processor, to cause the apparatus to:
use said identifier for the previously authenticated user to retrieve the details derived from the first image; and,
send said details to a system remote from the apparatus together with said identifier.

14. The apparatus of claim 11, wherein the at least one memory and the computer program code are further configured, with the at least one processor, to cause the apparatus to encode said second image using a one-way encoding algorithm prior to storing the encoded second image whereby to store the second image.

15. The apparatus of claim 11, wherein, in the event that it is determined that the first and second images are images of the same user, the at least one memory and the computer program code are further configured, with the at least one processor, to cause the apparatus to send said identifier to a system remote from said apparatus whereby to indicate that the user of the device has been verified as the user associated with said identifier.

16. The apparatus of claim 11, wherein the device is associated with a unique device identifier, and in the event that it is determined that the first and second images are images of the same user, the at least one memory and the computer program code are further configured, with the at least one processor, to cause the apparatus to store an association between said unique device identifier and the second image.

17. The apparatus of claim 16, wherein, in the event that it is determined that the first and second images are images of the same user, the at least one memory and the computer program code are further configured, with the at least one processor, to cause the apparatus to send said unique device identifier to a system remote from said apparatus with an indication that the user of the device has been verified.

18. The apparatus of claim 11, wherein the at least one memory and the computer program code are further configured, with the at least one processor, to cause the apparatus to designate one of the first and second images as the higher quality image by comparing the image quality of the first image to the image quality of the second image.

19. The apparatus of claim 11, wherein the apparatus is communicatively connected to a plurality of devices and is configured to verify whether a user on any of said plurality of devices corresponds to a said previously authenticated user.

20. The apparatus of claim 11, wherein the at least one memory and the computer program code are further configured, with the at least one processor, to cause the apparatus to compare the first image to the second image, whereby to determine whether they are images of the same user, wherein the comparison includes:
assessing an image quality of each of a plurality of sections of the first image, whereby to assign an image quality to each of said plurality of sections of the first image;
for at least one section of the first image that is determined to have an image quality different from the image quality of others of said plurality of sections of the first image:
configuring a matching algorithm for that section of the first image in dependence on the assigned image quality of that section of the first image; and
using the configured matching algorithm to compare said section of the first image with a corresponding section of the second image, whereby to determine whether the first and second images are images of the same user.

21. The apparatus of claim 11, wherein the apparatus is configured on a mobile device.

22. The apparatus of claim 11, wherein the apparatus is configured on a server system.

23. A non-transitory computer-readable storage medium, comprising a set of computer-readable instructions stored thereon, which, when executed by a processing system having access to a first image and a second image, cause the processing system to perform a method of verifying whether a user of a device corresponds to a previously authenticated user, the method comprising:
comparing said first image to said second image to determine whether they are images of the same user, wherein the first image is an image of an identity document comprising an image of a previously authenticated user and data identifying the previously authenticated user, the identity document having been previously authenticated in respect of the previously authenticated user by a trusted authority; and,
when it is determined that the first and second images are images of the same user:
designating one of the first and second images as a higher quality image;
storing said designated image as a validated image of the previously authenticated user in a storage device together with an identifier for the previously authenticated user, said designated image being designated for use in a subsequent verification event for the previously authenticated user; and
arranging for derived data to be stored, together with said identifier for the previously authenticated user, whereby to enable said data to be retrieved in a subsequent verification event for the previously authenticated user, wherein the derived data is derived by the processing system from the identity document, said data identifying the previously authenticated user, and
wherein the second image is an image captured by the device.

* * * * *